US012753370B2

(12) United States Patent
Murali

(10) Patent No.: US 12,753,370 B2
(45) Date of Patent: Oct. 6, 2026

(54) SURFACE TREATING FORMULATION COMPRISING A GAS-TO-LIQUID PARAFFINIC SOLVENT AND METHOD OF MAKING AND USING THE SAME

(71) Applicant: Energizer Auto, Inc., St. Louis, MO (US)

(72) Inventor: Jahnavi Murali, St. Louis, MO (US)

(73) Assignee: Energizer Auto, Inc., St. Louis, MO (US)

( * ) Notice: Subject to any disclaimer, the term of this patent is extended or adjusted under 35 U.S.C. 154(b) by 531 days.

(21) Appl. No.: 18/448,816

(22) Filed: Aug. 11, 2023

(65) Prior Publication Data

US 2024/0052268 A1 Feb. 15, 2024

Related U.S. Application Data

(60) Provisional application No. 63/371,499, filed on Aug. 15, 2022.

(51) Int. Cl.

| | |
|---|---|
| ***C11D 9/24*** | (2006.01) |
| ***C11D 3/37*** | (2006.01) |
| ***C11D 3/43*** | (2006.01) |
| ***C11D 11/00*** | (2006.01) |
| ***C11D 17/00*** | (2006.01) |

(52) U.S. Cl.

CPC ................ *C11D 3/373* (2013.01); *C11D 3/43* (2013.01); *C11D 11/0094* (2013.01); *C11D 17/0017* (2013.01); *C11D 17/0043* (2013.01); *C11D 2111/18* (2024.01); *C11D 2111/42* (2024.01)

(58) Field of Classification Search

CPC .. C11D 1/72; C11D 3/18; C11D 3/181; C11D 3/373; C11D 3/3765; C11D 3/43; C11D 7/24; C11D 7/241; C11D 7/5004; C11D 7/5072; C11D 7/509; C11D 9/24; C11D 2111/14; C11D 2111/16

See application file for complete search history.

(56) References Cited

U.S. PATENT DOCUMENTS

| | | | | |
|---|---|---|---|---|
| 5,753,607 | A | 5/1998 | Burke et al. | |
| 5,977,050 | A | 11/1999 | Faris | |
| 2005/0250668 | A1 | 11/2005 | Serobian et al. | |
| 2011/0312497 | A1 * | 12/2011 | Barg | A01N 25/00 504/358 |
| 2013/0260068 | A1 * | 10/2013 | Serobian | C09D 183/04 524/266 |
| 2019/0076223 | A1 * | 3/2019 | Yoshinaga | B22C 9/043 |
| 2022/0041867 | A1 * | 2/2022 | Alwattari | C09G 1/08 |

OTHER PUBLICATIONS

Search Report for International Application No. PCT/US2023/072106, Dated Nov. 2, 2023, 10 pages.

* cited by examiner

*Primary Examiner* — Charles I Boyer
(74) *Attorney, Agent, or Firm* — Lee & Hayes, P.C.

(57) ABSTRACT

A surface treating formulation with an organic solvent and a reduced amount of silicone fluid. In examples, the organic solvent may be a gas-to-liquid solvent and may include a synthetic paraffinic hydrocarbon. The silicone fluid may include at least a silicone having a viscosity of at least 1000 cSt. Examples of the formulation may include a rheology modifier, one or more surfactant, a pH adjusting agent, a preservative, and an inorganic solvent, such as water. The formulation may optionally include additional additives. In examples, a surface may be treated by spraying or wiping thereon the surface treating formulation.

19 Claims, No Drawings

SURFACE TREATING FORMULATION COMPRISING A GAS-TO-LIQUID PARAFFINIC SOLVENT AND METHOD OF MAKING AND USING THE SAME

CROSS REFERENCE TO RELATED APPLICATIONS

This application claims the benefit of U.S. Provisional Application No. 63/371,499 filed Aug. 15, 2022, which is incorporated herein by reference in its entirety.

FIELD OF THE INVENTION

The present invention relates generally to a surface treating formulation and method of making and using the same. More particularly to formulation and methods of making and using a formulation including a high viscosity silicone fluid and a low viscosity and/or low volatility organic solvent such as a gas-to-liquid solvent.

BACKGROUND

Formulations used in the automotive industry heavily rely on the use of silicone-based formulations. The formulations are often used as cleansers, protectant, gloss enhancers, or any combination thereof. The protectants also can be formulated to protect such surfaces from the damaging effects of UV rays, sunlight, heat, moisture, and other elements. New and improved formulations can be useful in enhanced performance and/or achieve more cost-effective formulations.

DETAILED DESCRIPTION

This application relates to a surface treating formulation and method of making and using the same. In examples, the formulation may include a solution. In examples, the formulation may include silicone. In examples, the formulation may include an organic solvent. In examples, the organic solvent can be a synthetic paraffinic product. In examples, the organic solvent may include a hydrocarbon. In examples, the hydrocarbon may include a paraffinic compound. In examples, the organic solvent may have a viscosity that is below 20 $mm^2/s$, for example, 1 $mm^2/s$ to 10 $mm^s/s$. In examples, the organic solvent may include less than 2% or less than 1% aromatic components. In examples, the organic solvent may include a gas-to-liquid (GTL) solvent. In examples, a formulation may include a mixture of a silicone and of a GTL solvent.

In examples, the formulation is a solution that may be used as a protectant, cleanser, gloss enhancer, or any combination thereof. In examples, the formulation may be used any type of surface such as one or more surfaces. In examples, surfaces to which the formulation may be applied may include vinyl, leather, plastics, rubber, and other interior and exterior surfaces, such as for example, tires, rubber mats, vehicle seats, dashboards, arm rest, and the like. In examples, the formulation may have different applications such as, for example, in an automobiles, boats, trains, planes, outdoor furniture, indoor furniture, or other objects, and for a variety of interior and exterior uses. In examples, the formulation as described may be used in an automobile.

In examples, the formulation may be poured or sprayed directly onto the surface to be treated, and/or may be initially sprayed onto an applicator such as a cloth, pad, sponge, or other wipe device.

In examples, the formulation may enhance the shine or gloss of the substrate surface. In examples, the formulation may be configured to include UV protectors and/or one or more additives that can promote added utility such as, for example, odor elimination, fragrance, or antibacterial.

In examples, the organic solvent, e.g. a GTL solvent, can be a synthetic paraffinic product. In examples, the organic solvent, e.g. a GTL solvent, may have a viscosity that is less than the viscosity of typical mineral or natural oils.

In examples the silicone may be one or more silicone oils. In examples, at least one silicone may have a viscosity that is 1000 cSt or higher.

In examples, the formulation can include a mixture of silicone and a solvent such as an organic solvent and/or GTL solvent. In examples, the amount of silicone in the formulation is low compared to other known formulations. In examples, the formulation may include less than 10 wt % silicone, for example, less than 3 wt % silicone. In examples, the formulation including the organic solvent as described, for example a GTL solvent, can include less than 10 wt %, for example less than 3 wt % silicone and still be able to improve, impart and/or maintain shine and gloss on a substrate surface. In examples, the formulation as described can achieve the same or better results as solutions that require significantly higher concentrations of silicone.

In examples, the formulation can include one or more rheology modifiers. In examples, the formulation can include one or more surfactants. In examples, the one or more surfactants can be non-ionic surfactants. In examples, the formulation can include one or more base materials. In examples, the formulation can include one or more preservatives. In examples, the formulation can include water. In examples, the water can be deionized water. In examples, the formulation can include one or more additives.

In examples, the formulation can include one or more optional adjuncts, such as one or more builders, buffering agents, opacifiers, cleaning agents, cleaning aids, protective agents, chelators, cosolvents, cosurfactants, descalers, foam boosters, foam suppressants, surface modification agents, wetting agents, stain and soil repellents, waxes, resins, polishes, abrasives, colloid stabilizers, waxes, lubricants, odor control agents, perfumes, fragrances and fragrance release agents, brighteners, fluorescent whitening agents, ultraviolet light (UV) absorbers, UV scatterers, excited state quenchers, anti-oxidants, oxygen quenchers, bleaching agents, electrolytes, dyes and/or colorants, phase stabilizers, emulsifiers, defoamers, hydrotropes, cloud point modifiers, antimicrobial agents, preservatives, biocides, and mixtures thereof. These optional one or more adjuncts may be employed in embodiments of the formulation to provide further cleaning and/or protective benefits or functionality. When employed, each of these one or more optional adjuncts may individually comprise 0.0001-5 wt % of the formulation, for example 0.001-2 wt %, or about 0.01-1 wt %.

In examples, the formulation as described herein may be formed by mixing together a GTL solvent, silicone, one or more rheology modifiers, one or more surfactants, one or more base materials, one or more preservatives, one or more additives, and water. In examples, the mixing of compounds may be performed in order. For example, the formulation may be formed using a mixer by starting with about half the water that will ultimately go into the formulation and while continuously agitating the fluid adding in order one or more rheology modifiers, one or more surfactants, one or more silicone fluids, one or more additives such as one or more fragrances, one or more organic solvents, e.g. GTL solvents, one or more preservatives, and one or more pH modifying agents/rheology modifying agents. In examples, the mixture was agitated for about 20 min before adding the remainder of the water and then agitated for an additional 20 min.

In examples, disclosed is an aqueous formulation including a gas-to-liquid paraffinic solvent; a silicone fluid having a viscosity of at least about 1000 cSt; a rheology modifier; a surfactant; and an inorganic solvent.

In examples, a total concentration of silicone fluid in the aqueous dispersion may be less than 3 wt %.

In examples, the gas-to-liquid paraffinic solvent may include a synthetic hydrocarbon.

In examples, the gas-to-liquid paraffinic solvent may include a hydrocarbon having a carbon content within the range of C18 to C24.

In examples, the gas-to-liquid paraffinic solvent may have a viscosity within a range of 1 mm2/s to 10 mm2/s.

In examples, the gas-to-liquid paraffinic solvent may be present in an amount of 1 wt % to 5 wt %.

In examples, the silicone fluid may be present in an amount in the range of 1 wt % to 3 wt %.

In examples, the aqueous formulation may include a second silicone fluid having a viscosity below 1000 cSt, wherein the first silicone fluid is present in an amount of at least 1.5 wt %.

In examples, the surfactant may be a non-ionic surfactant.

In examples, the inorganic solvent may be water.

In examples, the aqueous formulation may include a pH adjusting agent and a preservative.

In examples, the aqueous formulation may include a rheology modifier.

In examples, disclosed is a formulation including a gas-to-liquid solvent in an amount of 1 wt % to 5 wt %; a silicone fluid in an amount of 0.5 wt % to 3 wt %; a rheology modifier in an amount of 0.5 wt % to 1.5 wt %; a surfactant in an amount of 0.5 wt % to 1.5 wt %; a preservative in an amount of 0.001 wt % to 1 wt %; a pH adjusting agent in an amount of 0.01 wt % to 4 wt %; and water.

In examples, the gas-to-liquid solvent may be a synthetic paraffinic hydrocarbon that is less than 2% aromatic and has a viscosity that is less than 20 mm2/s.

In examples, the silicone fluid may include a silicone having a viscosity of at least 1000 cSt.

In examples, the rheology modifier may include a hydrophobically modified alkali-swellable emulsion.

In examples, the surfactant may include a first surfactant with a first HLB value and second surfactant with a second HLB value different from the first HLB value.

In examples, the pH adjusting agent include a TEA aqueous solution at 75% concentration.

In examples, provided is a protectant formulation including an organic solvent having a viscosity that is lower than 20 mm2/s; a silicone fluid; one or more additives; and water.

In examples, the organic solvent may include a gas-to-liquid solvent.

In examples, the ratio of gas-to-liquid solvent to silicone fluid ranges from 0.5:2 to 1:2, and the total amount of silicone fluid is less than 3 wt %.

In examples, the gas-to-liquid solvent may include a synthetic product.

In examples, the water may be present in an amount of at least 90 wt %.

In examples, provided is a method including adding a rheology modifier to water; adding one or more surfactants after the addition of the rheology modifier; adding a silicone fluid after the one or more surfactants; adding an organic solvent after the silicone fluid; adding a pH adjusting agent after the organic solvent; adding additional water after the pH adjusting agent.

In examples, the method may include continuously agitating the mixture while adding the components.

In examples, the method may include adding a preservative after the organic solvent and before the additional water.

In examples, the method may include delaying the adding of the additional water by 20 min.

In examples, the method may include continuing agitation for about 20 min after the adding of the additional water.

In examples, disclosed is a method of treating a surface including spraying the surface with a formulation including a gas-to-liquid solvent; and a silicone fluid.

In examples, disclosed is a method of treating a surface including applying to wiper a formulation including a gas-to-liquid solvent; and a silicone fluid; and wiping the surface with the wiper with the formulation applied thereto.

In examples, provided is method of treating a surface including spraying the surface with a formulation including an organic solvent having a viscosity that is less than 20 mm2/s; and a silicone fluid.

In examples, provided is a method of treating a surface including applying to wiper a formulation including an organic solvent having a viscosity that is less than 20 mm2/s; and a silicone fluid; and wiping the surface with the wiper with the formulation applied thereto.

Reference will now be made in detail to examples of the formulation and the methods of using and making the formulation. The formulation and the methods of using and making the formulation are not limited to those particularly exemplified herein. Also, the terminology used herein is for the purpose of describing the examples only and is not intended to limit the scope of the description in any manner.

Unless defined otherwise, all technical and scientific terms used herein have the same meaning as is commonly understood by one of skill in the art to which the inventions pertain.

All patents, patent applications, published applications and publications, websites and other published materials referred to throughout the entire disclosure herein, unless noted otherwise, are incorporated by reference in their entirety. If a plurality of definitions exists for terms used herein, then those in this section prevail.

As used herein, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and, also "5 percent." "About" means within typical experimental error for the application or purpose intended.

As used herein, "optional" or "optionally" means that the subsequently described event or circumstance does or does not occur, and that the description includes instances where the event or circumstance occurs and instances where it does not. For example, an optional component in a system means that the component may be present or may not be present in the system.

As used herein, a "combination" refers to any association between two items or among more than two items. The association can be spatial or refer to the use of the two or more items for a common purpose.

As used herein, the terms "comprising", "including" and "containing" are synonymous, and are inclusive or open-ended. Each term indicates that additional, unrecited elements or method steps optionally can be included.

As used herein, "and/or," means "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "formulation" refers to a mixture of materials. In examples, a formulation can be a solution.

As used herein, "gas-to-liquid" or "GTL" refers to a gas-to-liquid chemical process in which natural gas may be converted into a synthetic product. For example, the gas-to-liquid chemical process can convert natural gas into fuel such as gasoline, diesel, or kerosene, base oils for lubricants, or other liquid products. In examples, the Fischer Tropsch process or like process can be used to convert carbon monoxide and hydrogen into hydrocarbons. The conversion may be carried out as a direct conversion or via syngas in a Fischer Tropsch based process. In examples, the direct conversion may include partial combustion of methane to methanol. In examples, the GTL process may first manufacture a synthesis gas ("syngas") by partial oxidation of a natural gas using a mixture of hydrogen and carbon monoxide. Impurities may then be removed from the syngas. The synthesis gas may then be converted into liquid hydrocarbons using a catalyst. In examples, the liquid formed may look and feel like wax at room temperature. The liquid hydrocarbons may then undergo cracking and/or isomerization to modify the molecule chains into products with desired properties. The resulting product of a GTL process is a synthetic product. In examples, the synthetic product is liquid. In examples, the product can have high purity.

An example of a Fischer-Tropsch based process is the SMDS (Shell Middle Distillate Synthesis) described by van der Burgt et al. in "The Shell Middle Distillate Synthesis Process", paper delivered at the 5th Synfuels Worldwide Symposium, Washington D.C., November 1985 (see also the November 1989 publication of the same title from Shell International Petroleum Company Ltd, London, UK), which is incorporated herein by reference. Additional examples of the process, including examples of catalysis for the Fischer-Tropsch synthesis of paraffinic hydrocarbons, and examples of post-synthesis treatments, such as polymerisation, alkylation, distillation, cracking-decarboxylation, isomerisation and hydroreforming, that may be employed to modify the properties of Fischer-Tropsch condensation products, are described in U.S. Pat. Nos. 4,125,566, 4,478,955, 4,385,193, 4,594,468, 10,041,013, and EP0583836A1, all of which are incorporated herein by reference.

The term "GTL solvent" as used herein refers to a solvent produced by the GTL process.

Effective amounts are generally those amounts listed as the ranges or levels of ingredients in the descriptions, which follow hereto. Unless otherwise stated, all value amounts, whether or not listed in percentage ("%'s"), are to be considered in weight percent (wt %) of the total formulation unless indicated otherwise.

As used herein, the term "polymer" generally includes, but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the molecule. These configurations include, but are not limited to isotactic, syndiotactic and random symmetries.

In examples, the formulation as described herein may be used as a protectant and/or cleanser. In examples, the formulation may be a surface protectant formulation and/or protectant solution. In examples, the formulation may be a surface cleaning formulation and/or solution. In examples, the formulation may be a surface protectant and cleaning formulation and/or solution. In examples, the formulation may improve, impart and/or maintain shine and/or gloss of a surface.

In examples, the formulation can include a mixture of an organic solvent with silicone. In examples, it has been discovered that by introducing organic solvent having a low viscosity and/or low aromatic composition it is possible to decrease the amount of silicone necessary to achieve desired properties of the solution. In examples, the use of an organic solvent as described herein can provide improved results as compared to other hydrocarbon solvents, for example, decreased greasiness level.

In examples, the organic solvent may have a low viscosity. In examples the organic solvent may have a low volatility. In example, the organic solvent may have low viscosity and low volatility as described herein. In examples, the organic solvent used for the formulation may include a gas-to-liquid (GTL) solvent.

In examples, the use of a GTL solvent may provide some benefits when compared to natural oils and other mineral oils including petroleum mineral oils. For example, GTL solvents can lead to a formulation that is more environmentally friendly and that exhibits improved properties. In examples, a GTL solvent can include low levels or no unsaturates/reactive olefins, aromatics, nitrogen, or sulfur present at 0 ppm detection limit. In examples, a GTL solvent can exhibit better color and cleaner and/or clearer appearance. In examples, GTL solvents may be odor free. In examples, GTL solvents may exhibit higher flash points and thus improving storage and handling safety. As described herein, GTL solvents may exhibit lower viscosity as compared to natural oils and mineral oils. In examples, GTL solvents may have reduced surface tension, which may lead to improved flowability and wetting properties of the formulation. GTL solvents may also exhibit lower densities when compared to other natural oils and mineral oils. Unlike natural oils and other mineral oils, GTL solvents are synthetic and thus may exhibit more consistent properties and tend to be more stable. In examples, GTL solvents can exhibit a faster biodegradability as compared to other petroleum based mineral oils. In examples, GTL solvents also are LVP-VOC exempt products for open emission consumer products, have inherent low ozone formation potential from lower photochemical reactivity than other petroleum/crude derived products in open emission applications. In examples, GTL solvents can exhibit improved color and oxidative stability on exposure to (UV) light and high heat conditions. In examples, the low level or absence of unsaturated, typically polyaromatic hydrocarbon (PAH) content can provide anti-yellowing and low oxidative performance increasing shelf-life expectancy, improved low-temperature performance with low volatility, low evaporation losses compared with conventional mineral oils, which may help minimize drying out and loss of performance. In examples, GTL solvents can exhibit lower potential for misting and fuming, enhancing safety and security of both worker exposure in operations and consumer exposures in use.

In examples the organic solvent, e.g. a GTL solvent, may have a viscosity that is below 20 $mm^2/s$. In examples, the organic solvent, e.g. a GTL solvent, may have a viscosity that falls within the range of about 1 $mm^2$/and about 10 $mm^2/s$, for example, the viscosity may be 1.0 to 3.5 mm2/s, for example, 1.0 mm2/s, 1.1 mm2/s, 1.2, mm2/s 1.3 mm2/s, 1.4 mm2/s, 1.5 mm2/s, 1.6 mm2/s, 1.7 mm2/s, 1.8 mm2/s, 1.9 mm2/s, or 2.0 mm2/s, 2.1 mm2/s, 2.2 mm2/s, 2.3 mm2/s, 2.4 mm2/s, 2.5 mm2/s, 2.6 mm2/s, 2.7 mm2/s, 2.8 mm2/s, 2.9 mm2/s, 3.0 mm2/s, 3.1 mm2/s, 3.2 mm2/s, 3.3 mm2/s, 3.4 mm2/s, 3.5 mm2/s, or within a range defined by any two of these examples. In examples, the viscosity may be 5 to 7 $mm^2/s$, for example 5.0 $mm^2/s$, 5.1 $mm^2/s$, 5.2 $mm^2/s$, 5.3 $mm^2/s$, 5.4 $mm^2/s$, 5.5 $mm^2/s$, 5.6 $mm^2/s$, 5.7 $mm^2/s$, 5.8 $mm^2/s$, 5.9 $mm^2/s$, 6 $mm^2/s$, 6.0 $mm^2/s$, 6.1 $mm^2/s$, 6.2 $mm^2/s$, 6.3 $mm^2/s$, 6.4 $mm^2/s$, 6.5 $mm^2/s$, 6.6 $mm^2/s$, 6.7 $mm^2/s$, 6.8 $mm^2/s$, 6.9 $mm^2/s$, 7 $mm^2/s$ or within a range defined by any two of these examples. For purposes of this description the viscosity values listed above should be understood as measured at 40° C. by ASTM D445 test method (as provided by the American Society for Testing and Materials (ASTM)).

In examples, the organic solvent, e.g. a GTL solvent, may have a low volatility. For examples, the organic solvent, e.g. a GTL solvent, may have vapor pressure at 20° C. that is less than or equal to 0.03 kPa. In examples, the organic solvent, e.g. a GTL solvent, may have vapor pressure at 20° C. that is less than or equal to 0.02 kPa. In examples, the organic solvent, e.g. a GTL solvent, may have vapor pressure at 20° C. that is less than or equal 0.01 kPa.

In examples, the organic solvent, e.g. a GTL solvent, may be highly pure and synthesized from methane gas. In examples, the organic solvent, e.g. a GTL solvent, may include only iso and normal paraffins. In examples, the organic solvent, e.g. a GTL solvent, may contain very low amounts of impurities such as sulfurs, olefins, and polycyclic aromatics. In examples, the organic solvent, e.g. a GTL solvent, may include one or more compounds that are at least 90% paraffins, at least 95% paraffins, 96% paraffins, at least 97% paraffins, at least 98% paraffins, or at least 99% paraffins, as determined by gas chromatography. In examples, the organic solvent, e.g. a GTL solvent, may include a paraffinic compound that is 2% or less aromatic. In examples, the organic solvent, e.g. a GTL solvent, may include a paraffinic compound that is 1% or less aromatic. In examples, the organic solvent, e.g. a GTL solvent, may include less than 500 mg/kg aromatics, less than 200 mg/kg aromatics, or less than 100 mg/kg aromatics, as tested by the SMS2728 (issued by Shell Global Solutions International B.V., Shell Technology Centre, Amsterdam, The Netherlands).

In examples, the organic solvent, e.g. a GTL solvent, can be a paraffinic product. In examples, the organic solvent, e.g. a GTL solvent, can be a synthetic paraffinic product. In examples, the organic solvent, e.g. a GTL solvent, can be a paraffinic hydrocarbon. In examples, the organic solvent, e.g. a GTL solvent, can be a synthetic paraffinic hydrocarbon. In examples, the organic solvent, e.g. a GTL solvent, may include one or more linear or cyclic paraffins and/or alkanes formed of carbon chains having 10 to 24 carbons (C10 to C24 chains). In examples, the organic solvent may include a C18 to C24. For example, the organic solvent, e.g. a GTL solvent, may include a hydrocarbon chains of C10, C11, C12, C13, C14, C15, C16, C17, C18, C19, C20, C21, C22, C23, C24, or having a carbon content within a range defined by any two of these examples. In examples, the majority of organic solvent, e.g. a GTL solvent, may include a linear paraffin and/or alkane structure.

In examples, the organic solvent, e.g. a GTL solvent, may have a surface tension that is 30 mN/m or less measured at 20° C. For example, the organic solvent, e.g. a GTL solvent, may have a surface tension of 30 mN/m, 29 mN/m, 28 mN/m, 27 mN/m, 26 mN/m, 25 mN/m, or less.

Examples of GTL solvent include, but are not limited to, Shell GTL GS190, GS215, GS250, GS270, GS310, GS1927, G70, G80, G85, and G100, as available at the time of this application. Other GTL solvents may also be used.

In examples, the total content of the organic solvent, such as for example of the GTL solvent, in the formulation may be from about 1 wt % to about 5 wt %. In examples, the formulation may include a mixture of two or more organic solvents. In examples, a two or more organic solvents may include at least one GTL solvent. In examples, a mixture of two or more organic solvents may include two or more GTL solvents. In examples, a mixture of two or more organic solvents may include only two or more GTL solvents.

In examples, the total content of the organic solvent, e.g. a GTL solvent, in the formulation may be from about 1 wt % to about 2 wt %, about 1 wt % to about 3 wt %, about 1 wt % to about 4 wt %. For example, the total content of GTL solvent in the formulation may be 1.0 wt %, 1.05 wt %, 1.10 wt %, 1.15 wt %, 1.20 wt %, 1.25 wt %, 1.30 wt %, 1.35 wt %, 1.40 wt %, 1.45 wt %, 1.50 wt %, 1.55 wt %, 1.60 wt %, 1.65 wt %, 1.70 wt %, 1.75 wt %, 1.80 wt %, 1.85 wt %, 1.90 wt %, 1.95 wt %, 2.0 wt %, 2.05 wt %, 2.10 wt %, 2.15 wt %, 2.20 wt %, 2.25 wt %, 2.30 wt %, 2.35 wt %, 2.40 wt %, 2.45 wt %, 2.50 wt %, 2.55 wt %, 2.60 wt %, 2.65 wt %, 2.70 wt %, 2.75 wt %, 2.80 wt %, 2.85 wt %, 2.90 wt %, 2.95 wt %, 3.0 wt %, 3.05 wt %, 3.10 wt %, 3.15 wt %, 3.20 wt %, 3.25 wt %, 3.30 wt %, 3.35 wt %, 3.40 wt %, 3.45 wt %, 3.50 wt %, 3.55 wt %, 3.60 wt %, 3.65 wt %, 3.70 wt %, 3.75 wt %, 3.80 wt %, 3.85 wt %, 3.90 wt %, 3.95 wt %, 4.0 wt %, 4.05 wt %, 4.10 wt %, 4.15 wt %, 4.20 wt %, 4.25 wt %, 4.30 wt %, 4.35 wt %, 4.40 wt %, 4.45 wt %, 4.50 wt %, 4.55 wt %, 4.60 wt %, 4.65 wt %, 4.70 wt %, 4.75 wt %, 4.80 wt %, 4.85 wt %, 4.90 wt %, 4.95 wt %, 5.0 wt %, or within a range defined by any two of these examples.

In examples, a formulation may include a mixture of two or more organic solvents, e.g. GTL solvents, as described herein in combination with one or more natural oils and/or a mineral oils as those, for example, described in U.S. Pat. No. 8,974,589, which is incorporated herein by reference.

In examples, the silicone in the formula can be include organopolysiloxane fluid. Organopolysiloxane fluids are commonly referred to as "silicone oils" or "silicones" and are distinguished from silicone elastomers and resins, which are more thoroughly cross-linked than silicone oils. The silicone used in the formulation generally has a neat viscosity of about 1 cSt to about 1,000,000 cSt (25° C.) (ASTM D4283), typically about 10 cSt to about 100,000 cSt, more typically about 50 cSt to about 50,000 cSt, still more typically about 100 cSt to about 25,000 cSt, yet still more typically about 150 cSt to about 10,000 cSt, even more typically about 150 cSt to about 5,000 cSt, still even more typically about 150 cSt to about 2,000 cSt, and still yet even more typically about 150 cSt to about 1,000 cSt. The silicone component of the formulation may contain a mixture of both low and high viscosity silicones. In examples, the formulation as described herein may include at least one silicone that has a viscosity of 1000 cSt or higher. Mixtures of various silicones can be used, including mixtures of silicones of differing viscosities. The silicones used in the formulation can have a small particle size (e.g., 10 nm to 2000 nm); however, this is not required.

Suitable silicones that can be used in the formulation include those based on organopolysiloxane, these being selected from the class of polymers having the general formula $(R_nSiO_{((4-n)/2)})_m$, wherein n is between 0 and 3 and m is 2 or greater, and R is alkyl or aryl, as defined in Silicone Compounds Register and Review, 5th Edition, R. Anderson, G. L. Larson and C. Smith Eds., Huls America Inc., Piscataway, N.J., p 247 (1991), which is fully incorporated herein by reference. The value of m may be as large as one million or more, but more commonly has a value of between about 5 and 1000, these being readily flowable liquids with good handling properties and performance characteristics. These silicones can be linear or branched. Various naming conventions and nomenclature that are essentially equivalent to this exemplary class of silicones, include, but are not limited to: dialkylpolysiloxane hydrolyzate; alpha-alkyl-omega-methoxypolydialkylsiloxane; polydialkyl silicone oil; poly(dialkylsiloxane); alkyl end-blocked polydialkylsiloxane; polyoxy(dialkylsilylene), alpha-(trialkylsilyl)-omega-hydroxy; poly[oxy(dialkylsilylene)], alpha-[trialkylsilyl]-omega-[(trialkylsilyl)oxy]; and alpha-(trialkylsilyl)poly[oxy(dialkylsilylene)]-omega-alky. Some additional suitable examples also include dimethicone copolyol, dimethylpolysiloxane, diethylpolysiloxane, high molecular weight dimethicone, mixed C1-C30 alkyl polysiloxane, phenyl dimethicone, dimethiconol, and mixtures thereof. Non-limiting examples of silicones useful herein are also described in U.S. Pat. No. 5,011,681, which are fully incorporated herein by reference. The silicone compounds that can also or alternatively be used in the formulation include polyalkyl and/or polyaryl siloxanes. The alkyl or aryl groups substituted on the siloxane chain (R) or at the ends of the siloxane chains can have any structure as long as the resulting silicone remains fluid at or around room temperature (70° F.). Suitable R groups include hydroxy, methyl, methoxy, ethyl, ethoxy, propyl, propoxy, phenyl, methylphenyl, phenylphenyl, aryl and aryloxy. One or more R groups on the silicon atom may represent the same group or different groups, or any combination thereof. Suitable silicone compounds that can also or alternatively be used in the formulation are polydimethylsiloxane, polydiethylsiloxane, and polymethylphenylsiloxane. Polydimethylsiloxane, which is also known as dimethicone, is readily available in many forms and grades, including for example, edible grades suitable for use in compositions for food contact usage. The polyalkylsiloxanes that can be used include, for example, polydimethylsiloxanes. These silicone compounds are available, for example, from the General Electric Company in their Viscasil® and SF 96 series, and from Dow Corning in their Xiameter™ TV-4133-M2, RTV-4250-S, RTV-4251-52, RTV-4136-M, Xiameter™ PMX200 series such as PMX200 1,000 cSt, PMX200 10,000 cSt, PMX 200 12,500 cSt, PMX200 30,000 cSt, PMX200 100,000 cSt, and in their Dow Corning 200, 300 and 350 series. Polyalkylaryl siloxane fluids containing one or more alkyl or alkylaryl substitutes can also be used, for example, and include, but are not limited to polymethylphenylsiloxanes, poly[(dimethylsiloxane)/(methylvinylsiloxane)], poly[(dimethylsiloxane)/(diphenylsiloxane)], poly[(dimethylsiloxane)/(phenylmethylsiloxane)], and poly[(dimethylsiloxane)/(diphenylsiloxane)/(methylvinylsiloxane)]. These siloxanes are available, for example, from the General Electric Company as SF 1075 methyl phenyl fluid or from Dow Corning as DOWSIL SH 200 C silicone fluids, Rhodorsil Oils 47 from Bluestart Silicones, the silicones of the PK series from Bayer, such as PK20, the silicones of the PN and PH series from Bayer, such as PN 1000 and PH 1000, and certain oils of the SF series from General Electric, such as SF 1250, SF 1265, SF 1154 and SF 1023. Higher molecular weight silicones, including silicone gums and resins, may be used in accordance with the formulation and include polydiorganosiloxanes with a molecular mass of between 200,000 and 5,000,000, used alone or as a mixture in a solvent chosen from volatile silicones, polydimethylsiloxane (PDMS) oils, polyphenylmethylsiloxane (PPMS) oils, isoparaffins, methylene chloride, pentane, dodecane, tridecane and tetradecane, or mixtures thereof. The silicones can be linear or branched, and can be modified by chemical groups to provide additional properties. For example, suitable silicones also include the amino modified silicones, wherein R is an amine, amide or alkyl, dialkyl or trialkyl derivatized amine constituent. By substitution of one or more of the R groups with other organic or functionalized organic groups, such as vinyl, phenyl, fluoroalkyl, perfluoroalkane, carboxylic acid derivatives, carboxyester and quaternary ammonium derivatives, other organopolysiloxane can be produced. Included are mixtures of these materials, for example, but not limited to: 1) mixtures formed from a poly dimethylsiloxane hydroxylated at the end of the chain (Dimethiconol according to the CTFA nomenclature) and from a cyclic polydimethylsiloxane (Cyclomethicone according to the CTFA nomenclature), such as the product Q2 1401 sold by the company Dow Corning; 2) mixtures formed from a polydimethylsiloxane gum with a cyclic silicone, such as the product SF 1214 Silicone Fluid from General Electric, which is an SE 30 gum of MW 500,000 dissolved in SF 1202 Silicone Fluid (decamethylcyclopentasiloxane); 3) mixtures of two PDMS materials of different viscosities, for example a PDMS gum and a PDMS oil, such as the products SF 1236 and CF 1241 from the company General Electric. The product "SF 1236" is a mixture of an SE 30 gum defined above, with a viscosity of 20 $m^2/s$, and of an SF 96 oil with a viscosity of $5\times10^{-5}$ $m^2/s$ (15% SE 30 gum and 85% SF 96 oil). The product "CF 1241" is a mixture of an SE 30 gum (33%) and of a PDMS (67%) with a viscosity of 10-3 $m^2/s$. The organo-modified silicones in accordance with this description are silicones as defined above, containing in their general structure one or more organofunctional groups directly attached to the siloxane chain or attached via a hydrocarbon-based radical. Non-limiting examples include silicones containing: a) polyethyleneoxy and/or polypropyleneoxy groups, optionally containing alkyl groups, such as: the product known as dimethicone copolyol sold by the company Dow Corning under the name "DC 1248", and alkyl (C12) methicone copolyol sold by the company Dow Corning under the name "Q2 5200", the oils "Silwet" L 722, L 7500, L 77 and L 711 from the company General Electric, the mixture of dimethicone copolyol and of cyclomethicone, such as the product sold under the name "Q2-3225C" by the company Dow Corning; the product "Mirasil DMCO" sold by Rhone-Poulenc; b) (per)fluoro groups, for instance trifluoroalkyl groups, such as, for example, those sold by the company General Electric under the names "FF 150 Fluorosilicone Fluid" or by the company Shin Etsu under the names "X-22-819", "X-22-820", "X-22-821", "X-22-822" or "FL 100"; c) hydroxyacylamino groups, such as those described in European patent application EP-A-0,342,834, and in particular the silicone sold by the company Dow Corning under the name "Q2-8413"; d) thiol groups, such as in the silicones "X 2-8360" from Dow Corning or "GP 72A" and "GP 71" from Genesee; Union Carbide or the silicone known as "Amodimethicone" in the CTFA dictionary; f) carboxylate groups, such as the products described in European patent EP 186,507 from Chisso Corporation, which is hereby incorporated by reference; g) hydroxylated groups, such as the polyorganosiloxanes containing a hydroxyalkyl function, described in patent application FR-A-2,589,476, which is hereby incorporated by reference, and in particular polyorganosiloxanes containing a .gamma.-hydroxy-propyl function; h) alkoxylated groups containing at least 12 carbon atoms, such as the product "Silicone Copolymer F 7551" from SWS Silicones and the products "Abilwax 2428", "Abilwax 2434" and "Abilwax 2440" from the company Goldschmidt; i) acyloxyalkyl groups containing at least 12 carbon atoms, such as, for example, the polyorganosiloxanes described in patent application FR-A-2,641,185, which is hereby incorporated by reference, and in particular polyorganosiloxanes containing a stearoyloxypropyl function; j) quaternary ammonium groups, such as in the products "X2 81 08" and "X2 81 09" and the product "Abil K 3270" from the company Goldschmidt; k) amphoteric or betaine groups, such as in the product sold by the company Goldschmidt under the name "Abil B 9950"; and/or l) bisulphite groups, such as in the products sold by the company Goldschmidt under the names "Abil S 201" and "Abil S 255". The block copolymers having a polysiloxane-polyoxyalkylene linear block as repeating unit, which are used in the context of this description, include those that have the following general formula: $([Y(R_2SiO)aR'_2SiYO][C_nH_{2n}O)_b]_c$ in which R and R', which may be identical or different, represent a monovalent hydrocarbon-based radical containing no aliphatic unsaturation, n is an integer ranging from 2 to 4, a is an integer greater than or equal to 5, particularly between 5 and 200 and even more particularly between 5 and 100, b is an integer greater than or equal to 4, particularly between 4 and 200 and even more particularly between 5 and 100, c is an integer greater than or equal to 4, particularly between 4 and 1000 and even more particularly between 5 and 300, Y represents a divalent organic group which is linked to the adjacent silicon atom via a carbon-silicon bond and to a polyoxyalkylene block via an oxygen atom, the average molecular weight of each siloxane block is between about 400 and about 10,000, that of each polyoxyalkylene block being between about 300 and about 10,000, the siloxane blocks represent from about 10% to about 95% of the weight of the block copolymer, the average molecular weight of the block copolymer being at least 3000 and particularly between 5000 and 1,000,000 and even more particularly between 10,000 and 200,000. R and R' are suitably chosen from the group comprising alkyl radicals such as, for example, the methyl, ethyl, propyl, butyl, pentyl, hexyl, octyl, decyl and dodecyl radicals, aryl radicals such as, for example, phenyl and naphthyl, arylalkyl radicals such as, for example, benzyl and phenethyl, and tolyl, xylyl and cyclohexyl radicals. Y is suitably selected from radicals including —R"—, —R"—O—, —R"—NHCO—, —R"—NH—CO—NH—R"—NHCO or —R"—OCONH—R'"—NHCO—, where R" is a divalent alkylene group such as, for example, ethylene, propylene or butylene, and R'" is a divalent alkylene group or a divalent arylene group such as $—C_6H_4$, $—C_6H_4C_6H_4—$, $C_6H_4—CH_2—C_6H_4$, $C_6H_4—C(CH_3)_2C_6H_4$. Even more particularly, Y represents a divalent alkylene radical, more particularly the $—CH_2—CH_2—CH_2$-radical or the $—C_4H_8—$ radical. The preparation of the block copolymers used in the context of the formulation is described in European application EP 0,492,657, which is fully incorporated herein by reference.

Volatile silicones can be optionally used. Volatile silicones are silicone oils with sufficient vapor pressure or volatility sufficient to at least partially or completely evaporate into the atmosphere during and/or after application of the formulations onto a surface. When one or more volatile silicones are used in the formulation, the one or more volatile silicones are generally combined with one or more non-volatile silicones; however, this is not required. The more volatile silicones, when used, may promote leveling of the residual silicone polish film, thus deepening the color of painted surfaces, and to aid in controlling the flowability and/or spreadability of the composition, particularly in examples employing less volatile or non-volatile silicone oils that are designed to be deposited onto the treated surface. Volatile silicone fluids generally are low viscosity silicone fluids with an appreciable vapor pressure at ambient temperatures. Generally, the volatile silicone fluids, when used, have a viscosity of less than about 10 cSt at 25° C. (ASTM D-4283), and optionally less than about 5 cSt at 25° C.

Suitable volatile silicone fluids include the polydimethylcyclosiloxanes. Polydimethylcyclosiloxane fluids useful in the formulation can be defined by the general formula $[(CH_3)_2SiO]_x$ wherein x has a value from three to eight. Generally, the polydimethylcyclosiloxane fluid useful in the formulation is a mixture of one or more of the various species represented by the above formula. The commercial polydimethylcyclosiloxanes are mixtures of the various species represented by the above formula and are considered within the scope of the formulation. Some suitable polydimethylcyclosiloxane fluids for use in the formulation are those where octamethylcyclotetrasiloxane, decamethylcyclopentasiloxane, and dodecamethylcyclohexasiloxane (i.e., where x is from 4 to 6) predominate. The fluids where decamethylcyclopentasiloxane and dodecamethylcyclohexasiloxane predominate are particularly suited.

In accordance with another embodiment, those volatile silicone fluids manufactured by Dow Corning Corporation are used. It is believed that Dow Corning 245 and 345 volatile silicone fluids primarily consist of decamethylcyclopentasiloxane with lesser amounts of dodecamethylcyclohexasiloxane and minor amounts of octamethylcyclotetrasiloxane. Other suitable volatile silicones include "DC 244", "DC 245", "DC 246", "DC 344", "DC 345", and "DC 346" (manufactured by Dow Corning); Silicone 7207 and Silicone 7158 (manufactured by the Union Carbide Corp.); SF 1202 (manufactured by General Electric); and SWS-03314 (manufactured by SWS Silicones, Inc.).

Mixtures and combinations of any of the silicone oil examples herein, for example, silicone oils having different molecular weights, different viscosities, different functionalized derivatives, different volatilities and/or vapor pressures, different properties and benefits, and combinations thereof, may advantageously be combined in the formulations. For example, a "lighter" or lower viscosity polyorganosiloxane can be combined with a "heavier" or higher viscosity silicone oil, and/or a silicone gum and/or silicone. Alternatively, volatile silicone oil may be combined with less volatile or essentially non-volatile silicone oil, depending on the end use application. Alternatively, a silicone oil having spreading, wetting or selective leveling properties may be combined with another silicone oil in order to enhance the spreading and leveling of the combined silicone oil mixture for beneficial effect on the surfaces treated with the formulations described herein.

The use of silicone oils in the formulation that contains these and other substituted organopolysiloxane, and their combinations and mixtures, is a matter of choice, depending upon the material to be treated and/or the environment to which the treated materials are to be subject, as well as depending upon the desired surface characteristics desired to be imparted to the surface. The silicones may be premixed in their desired proportions prior to processing, or mixed during actual processing of the formulations, or combined into the formulations in any suitable order or fashion, subject solely to considerations of ease of handling, transport, mixing and processing of the formulations.

The silicone in the formulation is believed to provide a water and water vapor resistant coating upon the surface of the treated materials to enhance their resistance to environmental stresses, such as water permeation, oxygen permeation and assault by other environmental contaminants.

The silicone in the formulation is useful for imparting a shine or glossy coating to the treated surfaces, resulting in enhanced appearance and other aesthetic benefits associated with modification of incident light, such as refractive and diffusive contributions to specular reflections that contribute to the perception of enhanced color and tone, and decreased perception of surface defects such as scratches, stress cracks, striations, and other surface defects that commonly develop on surfaces with normal age and wear. Hence, the silicone is useful for its restorative effect when used on aged and worn surfaces, particularly elastomeric surfaces that suffer most from these conditions.

The silicone in the protective composition is also believed to provide a soil, oil, dirt and grime resistant coating upon the surface of the treated materials, such as for example, household surfaces including, but not limited to stainless steel, tile, porcelain, marble and the like, to enhance their resistance to staining and soiling, water and microbial growth. In examples, the silicone used in the formulation includes one or more of a silicone selected from polydimethylsiloxane (PDMS), polydiethylsiloxane, polymethylphenylsiloxane, polyalkylarylsiloxane, polyethyleneoxydialkylsiloxane, polypropyleneoxydialkylsiloxane and polydialkylcyclosiloxane. Other or additional types of silicone that can be used in the formulation are disclosed in U.S. Pat. Nos. 6,221,433 and 7,738,383, which are fully incorporated herein by reference. In examples, the viscosity of at least one silicone used in the formulation is 1000 cSt or higher (25° C.) (ASTM D-4283).

The silicone content of the formulation may be no more than about 10 wt %, for example less than about 5 wt %, or less than about 3 wt %. The silicone content of the formulation is also generally at least about 0.5 wt %. In examples, various ranges of silicone that can be successfully and economically used in the formulation. For example, the silicone content in various formulations can be about 0.5 to 10 wt %, about 0.5 to 5 wt %, about 0.5 to 3 wt %, about 1 wt % to 10 wt %, about 1 wt % to 5 wt %, about 1 wt % to 3 wt %, about 1.5 wt % to 10 wt %, and about 1.5 wt % to 5 wt %, about 1.5 wt % to 3 wt %, about 2 wt % to 10 wt %, 2 wt % to 5 wt %, 2 wt % to 3 wt %. In examples, where two or more silicones are used, the formulation may contain at least 2 wt % or at least 1.5 wt % of a silicone having a viscosity of 1000 cSt or higher.

In examples, the amount of total organic solvent, e.g. a GTL solvent, and total silicone can be maintained within a desired ratio. In examples, the ratio of the total amount of organic solvent, e.g. a GTL solvent, to the total amount of silicone fluid in the formulation may range from about 0.5:2 to about 1.5:2, for example about 0.5:2, 0.6:2, 0.7:2, 0.8:2, 0.9:2, 1:2, 1.1:2, 1.2:2, 1.3:2, 1.4:2, 1.5:2 or within any range defined by any two of these listed examples.

In examples, the formulation can include one or more adjuncts, such as one or more rheology modifying agents, builders, buffering agents, pH adjusting agents, opacifiers, surfactant, secondary organic solvents, cleaning agents, cleaning aids, protective agents, chelators, cosolvents, cosurfactants, descalers, foam boosters, foam suppressants, surface modification agents, wetting agents, stain and soil repellents, waxes, resins, polishes, abrasives, colloid stabilizers, waxes, lubricants, odor control agents, perfumes, fragrances and fragrance release agents, brighteners, fluorescent whitening agents, ultraviolet light (UV) absorbers, UV scatterers, excited state quenchers, anti-oxidants, oxygen quenchers, bleaching agents, electrolytes, dyes and/or colorants, phase stabilizers, emulsifiers, defoamers, hydrotropes, cloud point modifiers, antimicrobial agents, preservatives, biocides, and mixtures thereof. In examples, optional adjuncts may be employed in embodiments of the formulation to provide further cleaning and protective benefits or functionality to the formulation. When employed, each of these one or more optional adjuncts may individually comprise 0.0001-5 wt % of the formulation, for example about 0.001-2 wt % t, or about 0.01-1 wt %.

In examples, the formulation may include additional components to the organic solvent, e.g. a GTL solvent, and silicone. In examples, the formulation may include one or more rheology modifying agents. In examples, the formulation may include one or more surfactant. In examples, the formulation may include one or more base materials, such as for example, a rheology modifying agent. In examples, the formulation may include one or more preservatives. In examples, the formulation may include one or more additives. In examples, the balance of the formulation may include water. In examples, the water is deionized water. In examples, the water may be a mixture of deionized water and reverse osmosis (RO) water. In examples, the formulation may include a mixture of GTL solvent, silicone, rheology modifying agent, surfactant, base, preservative, and water. In examples, additives may also be included.

In examples, the formulation may include one or more rheology modifiers. A rheology modifier may facilitate forming a formulation solution that 1) can be properly dispensed (e.g., dispensed from a sprayer, dispensed as an aerosol, poured from a container, etc.), 2) has the desirable cling properties after being sprayed or otherwise applied onto the substrate surface, 3) forms the desired gloss and shine properties on a substrate surface, 4) maintains the mixture of organic solvent (e.g., mineral oil, natural oil) and inorganic solvent (e.g., water) for longer periods of time so as to increase the stability and shelf life of the formulation, and/or 5) has the desired thickness and viscosity.

In examples, the rheology modifier may include shear thinning inducing rheology modifier. In examples, the rheology modifier may include a hydrophobically modified alkali-swellable emulsion (HASE polymer). In examples, the HASE polymer may be configured such that when neutralized with a base is able to create a mesh that can hold oil pockets and can impart shear thinning properties to the formulation.

In examples, suitable polymers used as rheology modifiers may be selected from the group consisting of water soluble and water dispersible polyacrylate polymers and copolymers containing at least one acrylate monomer, water swellable and alkali swellable polyacrylate polymers and copolymers containing at least one acrylate monomer, non-linear polyacrylate polymers cross-linked with at least one polyalkenyl polyether monomer, film-forming and water swellable non-soluble polyacrylate polymers, hydrophobically modified cross-linked polyacrylate polymers and copolymers containing at least one hydrophobic monomer, water dispersible associative and non-associative polyacrylate polymers and copolymers containing at least one acrylate monomer, and mixtures thereof. In additional suitable polymers, copolymers or derivatives thereof are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xantham and carrageen. Also suitable are polymers selected from polyvinyl alcohols, polyvinyl alcohol copolymers and hydroxypropyl methyl cellulose (HPMC), xantham gum and starch.

Various types of rheology modifiers can be included in the formulation. Non-limiting examples of acceptable rheology modifiers include various poly(vinyl pyrrolidone/acrylic acid) sold under the name "Acrylidone" ® by ISP, sulfonated polystyrene polymers sold under the name Versaflex® sold by National Starch and Chemical Company, especially Versaflex 7000, hydrophobically modified alkali-swellable emulsions (HASE), alkali-swellable acrylic homopolymer or copolymer crosslinked with a polyalkenyl polyether, polyacrylic acid and/or polyacrylic acid/polyacrylate copolymers, e.g., those available under the trade names Pemulen (e.g., Pemulen 1621, 1622, TR-1, Tr-1) commercially available from Lubrizol; those commercially available under the tradename Carbopol (e.g., Carbopol 64, 676, EDT 2623, EDT 2691, EZ-2, EZ-3, EZ-4, Aqua 30, Aqua SF-1, Ultrez 20, Ultrez 21) (Lubrizol Advanced Materials, Inc. (formerly Noveon, Inc.), a subsidiary of The Lubrizol Corporation), and Acusol (e.g., Acusol 801S, 805S, 810A, 820, 823, 830); various acrylate/acrylamide copolymers (e.g., Novemer EC-1); various polyacryl-amides; associative polyethers such as polyoxyethylene and polyoxyethylene/polyoxypropylene copolymer polyethers capped with C8-30.alpha.-olefin oxides; various vegetable gums (e.g., gum tragacanth, gum acacia, gum arabic, carageenan gum, xanthan gum, and the like); various cellulose ethers (e.g., carboxymethyl cellulose, hydroxypropyl cellulose, and like).

The content of the rheology modifier in the formulation can be at least about 0.5 to 1.5 wt %. In examples, the rheology modifier is present in an amount of about 0.5 wt %, 0.6 wt %, 0.7 wt %, 0.8 wt %, 0.9 wt %, 1.0 wt %, 1.1 wt %, 1.2 wt %, 1.3 wt %, 1.4 wt %, 1.5 wt %, or within a range defined by any two of these examples. In examples, the formulation is formed to have a viscosity to enable the formulation to be sprayed and/or wiped onto a surface. In such an example, the formulation can have a viscosity of about 100-20,000 cSt (25° C.), about 250-10,000 cSt (25° C.), about 500-5,000 cSt (25° C.), about 1000-4000 cSt (25° C.), about 1200-3200 cSt (25° C.), about 1400-3000 cSt (25° C.), or about 1600-2800 cSt (25° C.).

In examples, the formulation may include a surfactant. In examples, the surfactant may be a mixture of two or more surfactants. In examples, the surfactant may include one or more ampholytic, amphoteric, zwitterionic, anionic, cationic, and/or non-ionic surfactants. Non-limiting examples of ampholytic, amphoteric, zwitterionic, anionic, cationic, and non-ionic surfactants are provided in U.S. Pat. No. 7,378,382, which is incorporated herein by reference.

In examples, the formulation may include one or more non-ionic surfactants. Example nonionic surfactants are also listed in U.S. Pat. No. 3,929,678, which is incorporated herein by reference. In examples, any alkoxylated nonionic surfactants may be suitable herein, for instance, ethoxylated and propoxylated nonionic surfactants. Alkoxylated surfactants can be selected from the classes of the nonionic condensates of alkyl phenols, nonionic ethoxylated alcohols, nonionic ethoxylated/propoxylated fatty alcohols, nonionic ethoxylate/propoxylate condensates with propylene glycol, and the nonionic ethoxylate condensation products with propylene oxide/ethylene diamine adducts.

The condensation products of aliphatic alcohols with from 1 to 25 moles of alkylene oxide, particularly ethylene oxide and/or propylene oxide, are suitable for use herein. The alkyl chain of the aliphatic alcohol can either be straight or branched, primary or secondary, and generally contains from 6 to 22 carbon atoms. Also suitable are the condensation products of alcohols having an alkyl group containing from 8 to 20 carbon atoms with from 2 to 10 moles of ethylene oxide per mole of alcohol.

Polyhydroxy fatty acid amides suitable for use herein are those having the structural formula:

$$R^2CONR^1Z$$

wherein: $R^1$ is H, C1-C4 hydrocarbyl, 2-hydroxyethyl, 2-hydroxypropyl, ethoxy, propoxy, or a mixture thereof, for instance, C1-C4 alkyl, or C1 or C2 alkyl; and $R^2$ is a C5-C31 hydrocarbyl, for instance, straight-chain C5-C19 alkyl or alkenyl, or straight-chain C9-C17 alkyl or alkenyl, or straight-chain C11-C17 alkyl or alkenyl, or mixture thereof-, and Z is a polyhydroxyhydrocarbyl having a linear hydrocarbyl chain with at least 3 hydroxyls directly connected to the chain, or an alkoxylated derivative (for example, ethoxylated or propoxylated) thereof. Z may be derived from a reducing sugar in a reductive amination reaction, for example, Z is a glycidyl.

Suitable fatty acid amide surfactants include those having the formula:

$$R^1CON(R^2)_2$$

wherein $R^1$ is an alkyl group containing from 7 to 21, or from 9 to 17 carbon atoms and each $R^2$ is selected from the group consisting of hydrogen, C1-C4 alkyl, C1-C4 hydroxyalkyl, and $—(C_2H_4O)_xH$, where x is in the range of from 1 to 3.

Suitable alkylpolysaccharides for use herein are disclosed in U.S. Pat. No. 4,565,647, which is incorporated herein by reference, having a hydrophobic group containing from 6 to 30 carbon atoms and a polysaccharide, e.g., a polyglycoside, hydrophilic group containing from 1.3 to 10 saccharide units.

Alkylpolyglycosides may have the formula:

$$R^2O(C_nH_{2n}O)_t(\text{glycosyl})_x$$

wherein $R^2$ is selected from the group consisting of alkyl, alkylphenyl, hydroxyalkyl, hydroxyalkylphenyl, and mixtures thereof in which the alkyl groups contain from 10 to 18 carbon atoms; n is 2 or 3; t is from 0 to 10, and x is from 1.3 to 8. The glycosyl may be derived from glucose.

In certain embodiments, the surfactants comprise nonionic seed oil surfactants, biodegradable, nonionic seed oil surfactants, low odor nonionic, alcohol ethoxylate surfactants, biodegradable nonionic, alcohol ethoxylate surfactants, nonionic, alcohol ethoxylate surfactants, narrow range non-ionic surfactants based on a synthetic primary alcohol with >80% linearity, non-ionic surfactants based on tridecyl alcohol, biodegradable alcohol ethoxylate surfactants comprising blends of C8-C10 alcohols and C14-C16 alcohols and C9 alcohols and C11 alcohols, nonionic fluorinated surfactants such as Capstone™ FS-31, and mixtures or combinations thereof.

In certain embodiments, the surfactants are selected from the group consisting of Dow EcoSurf™ surfactants, Nouryon Berol™ surfactants (for example, Berol 260, Berol 266, Berol 360, Berol 370, Berol SurfBoost AD15, Berol 05P, Berol 840, Berol 9985, Berol 226 SA, and Berol 175), and Rhodoline surfactants or mixtures and combinations thereof.

In examples, the formulation can form a weak emulsion that allows silicone to be released. In examples, the weak emulsion can be broken down by physical force when applying the formulation to a surface for example by wiping.

In examples, the surfactant can include a mixture of two or more surfactants having the same or different hydrophilic-lipophilic balance (HLB). In examples, a formulation may include at least two surfactants of differing HLB. It has been found that the combination of two surfactants with differing HLB values as described herein can lead to improved stability and improved wetting action. Also, using two surfactants with differing HLB values allows for better control of the overall viscosity of formula. Moreover, the use of two surfactants with differing HLB values may help achieve a white color to the formulation.

In examples, the HLB of each surfactant is 7 or above. In examples, the HLB of each surfactant may be within the range of about 7 to about 13. In examples, each surfactant may independently have an HLB level of 7 or above, 8 or above, 9 or above, 10 or above, 11 or above, 12 or above, 13, or within a range defined by any two of these listed values. In examples, the HLB difference between a first and second surfactants may be 0, 1, 2, 3 4, 5, 6, 7, 8, 9, or 10. In examples, the formulation may include no more than two surfactants. For example, a formulation may include a first surfactant having an HLB of about 12 and a second surfactant having an HLB of about 10. In example formulations, the amount of a first surfactant having a higher HLB level may be greater than the amount of a second surfactant having a lower HLB level. In examples, the ratio of higher HLB level surfactant to lower HLB level surfactant may range from 1:1 to 3.5:1, for example 1:1, 1.1:1, 1.2:1, 1.3:1, 1.4:1, 1.5:1, 1.6:1, 1.7:1, 1.8:1, 1.9:1, 2:1, 2.1:1, 2.2:1, 2.3:1, 2.4:1, 2.5:1, 2.6:1, 2.7:1, 2.8:1, 2.9:1, 3:1, 3.1:1, 3.2:1, 3.3:1, 3.4:1, 3.5:1, or with a range defined by any two of these examples.

In examples, the total surfactant present in the formulation may range from about 0.5 wt % to about 1.5 wt %. In examples, for a formulation intended to be sprayed, the surfactant content may range from about 0.5 wt % to about 0.75 wt %. In examples, for a formulation intended to be applied by wiping, the surfactant content may range from about 0.5 wt % to about 1.5 wt %.

In examples, the formulation may include one or more buffer and/or pH adjusting agents. In examples, the one or more buffer and/or pH adjusting agents can include a base. In examples, the buffering agents and/or pH adjusting agents may be used alone, or in mixtures, or in combination with or in the form of their appropriate conjugate acids and/or conjugate bases, for adjusting and controlling the pH of the formulations. A variety of buffering and/or pH adjusting agents can be optionally used in the formulation. The pH of the formulation can be about 6-9 pH, for example about 7-9 pH, or about 7.3-8.8 pH. Other pH values can also be possible. Such buffering and/or pH adjusting agents, when used, can include, but are not limited to, organic acids, mineral acids, amino acids, lower alcohol amines, alkali metal and alkaline earth salts of silicate, metasilicate, polysilicate, borate, hydroxide, carbonate, carbamate, phosphate, polyphosphate, pyrophosphates, triphosphates, tetraphosphates, ammonia, hydroxide, monoethanolamine, monopropanolamine, triethylamine (TEA), diethanolamine, dipropanolamine, triethanolamine, and 2-amino-2-methylpropanol. Some non-limiting specific examples include amino acids such as lysine; lower alcohol amines like monoalkanolamine, dialkanolamine and trialkanolamine; alkanolamines that include the mono-, di-, and tri-ethanolamines; tri(hydroxymethyl)amino methane (TRIS); 2-amino-2-ethyl-1,3-propanediol; 2-amino-2-methyl-propanol; 2-amino-2-methyl-1,3-propanol; disodium glutamate; N-methyl diethanolamide; 2-dimethylamino-2-methylpropanol (DMAMP); 1,3-bis(methylamine)-cyclohexane; 1,3-diamino-propanol N,N'-tetra-methyl-1,3-diamino-2-propanol; N,N-bis(2-hydroxyethyl)glycine (bicine); N-tris (hydroxymethyl)methyl glycine (tricine); ammonium carbamate; citric acid; acetic acid; ammonia; alkali metal carbonates (e.g., sodium carbonate, sodium bicarbonate, etc.); alkali metal phosphates (e.g., sodium polyphosphate, etc.); sodium and/or potassium hydroxide. Additional buffering and/or pH adjusting agent that can also or alternatively be used are disclosed in WO 95/07971, which is fully incorporated herein by reference.

In examples, a pH adjusting agent may also act as a rheology modifying agent. In examples, as a rheology modifying agent the additive may be configured to work with the one or more rheology modifiers in the formulation to obtain the desired thickness and/or viscosity of the formulation. The rheology modifying agent can be used to 1) maintain or enhance the properties of the rheology modifier, 2) maintain the stability and shelf life of the formulation, and/or 3) maintain the pH of the formulation. In examples, the rheology modifying agent may a) improve the cleaning efficiency of the formulation and/or b) function as a water softener and/or a sequestering agent. For example, the rheology modifying agent can be configured to buffer or neutralize the one or more rheology modifiers and/or one or more by-products of the one or more rheology modifiers so as to better enable the one or more rheology modifiers to function and/or to assist in the mixing together of the silicone and organic solvent and/or GTL solvent. In examples, one or more rheology modifying agents, when used, can have other or additional functions in the formulation. One type of additive that acts as a rheology modifying agent may be a compound that assists in the mixing of the organic solvent, e.g. a GTL solvent, and silicone in the formulation.

One non-limiting pH adjusting agent that may also work as a rheology modifying agent as described herein may be triethanolamine (TEA). In examples, TEA may be introduced as an aqueous solution or in pure form. In examples, TEA solution may be from about 70% to just under 100% concentration, for example from 75% to just under 100%. In examples, TEA may be introduced as 100% concentration, i.e. in pure form. In examples, the formulation includes TEA in aqueous solution at concentrations of about 70%, 71%, 72%, 73%, 74%, 75%, 76%, 77%, 78%, 79%, 80%, 81%, 82%, 83%, 84%, 85%, 86%, 87%88%, 89%, 90%, 91%, 92%, 93%, 94%, 95%, 96%, 97%, 98%, 99%, 99.99%, or at a concentration that falls within a range defined by any two of these listed values. In examples, TEA is added at 100% concentration.

In examples, the pH adjusting agent/rheology modifying agent can be effectively added to achieve the desired pH and/or achieve the desired effect with the rheology modifier. In examples, the formulation may contain one or more pH adjusting agents/rheology modifying agents in the total amount of about 0.01-4 wt % of the formulation, for example about 0.04-3 wt %, or about 0.3 to 1 wt %, for example 0.35 wt % to 0.45 wt %. In examples, the pH adjusting agent/rheology modifying agent may be present in an amount of about 0.35 wt %, 0.36 wt %, 0.37 wt %, 0.38 wt %, 0.39 wt %, 0.40 wt %, 0.41 wt %, 0.42 wt %, 0.43 wt %, 0.44 wt %, 0.45 wt %, or within a range defined by any two the listed examples.

In examples, the formulation may include one or more preservatives and/or biocides. Many different types of preservatives and/or biocides can be used in the formulation. Furthermore, one or more preservatives and/or biocides can be used in the formulation. Non-limiting of examples of preservatives that can be used in the formulation include, but are not limited to, mildewstat or bacteriostat, methyl, ethyl and propyl parabens, short chain organic acids (e.g. acetic, lactic and/or glycolic acids), bisguanidine compounds (e.g., Dantogard and/or Glydant) and/or short chain alcohols (e.g. ethanol and/or IPA). Non-limiting examples of mildewstat or bacteriostat include, but are not limited to, mildewstats (including non-isothiazolinones compounds) including Proxel GXL and Vantocil IB, from Avecia Corporation, Kathon GC, a 5-chloro-2-methyl-4-isothiazolin-3-one, KATHON ICP, a 2-methyl-4-isothiazolin-3-one, and a blend thereof, and KATHON 886, a 5-chloro-2-methyl-4-isothiazolin-3-one, and Neolone M-10, all available from Rohm and Haas Company; BRONOPOL, a 2-bromo-2-nitropropane 1,3 diol, from Boots Company Ltd., PROXEL CRL, a propyl-p-hydroxybenzoate, from ICI PLC; NIPASOL M, an o-phenyl-phenol, sodium salt, from Nipa Laboratories Ltd., DOWICIDE A, a 1,2-Benzoisothiazolin-3-one, Dowacil 75, and Bioban, all from Dow Chemical Co., and IRGASAN DP 200, a 2,4,4'-trichloro-2-hydroxydiphenylether, from Ciba-Geigy A.G, and Surcide P from Surety Laboratories, Dantogard Plus (e.g., 1,3-Bis(hydroxymethyl)-5,5-dimethylhydantoin and hydroxymethyl-5,5-dimethylhydantoin) commercially available from Lonza, Bioban DXN (e.g., dimethoxane) commercially available from Angus, benzisothiazolinone commercially available as TroyGuard BC11, from Troy Chemical Company, and other like materials. Non-limiting examples of biocides include quaternary ammonium compounds and phenolics. Non-limiting examples of these quaternary compounds include benzalkonium chlorides and/or substituted benzalkonium chlorides, di($C_6$-C14)alkyl di short chain ($C_{1-4}$ alkyl and/or hydroxyalkl) quaternary ammonium salts, N-(3-chloroallyl) hexaminium chlorides, benzethonium chloride, methylbenzethonium chloride, and cetylpyridinium chloride. Other quaternary compounds include the group consisting of dialkyldimethyl ammonium chlorides, alkyl dimethylbenzylammonium chlorides, dialkylmethylbenzylammonium chlorides, and mixtures thereof, wherein the alkyl radicals may be C1 to C24. Biguanide antimicrobial actives include, but not limited to, polyhexamethylene biguanide hydrochloride, p-chlorophenyl biguanide; 4-chlorobenzhydryl biguanide, halogenated hexidine such as, but not limited to, chlorhexidine (1,1'-hexamethylene-bis-5-(4-chlorophenyl biguanide) and its salts are also in this class. In examples, one or more preservatives and/or biocides may be included in the formulation in an amount of about 0.001 wt % and 1 wt %, for example 0.001 wt %, 0.005 wt %, 0.01 wt %, 0.02 wt %, 0.03 wt %, 0.04 wt %, 0.05 wt %, 0.06 wt %, 0.07 wt %, 0.08 wt %, 0.09 wt %, 0.10 wt %, 0.11 wt %, 0.12 wt %, 0.13 wt %, 0.14 wt %, 0.15 wt %, 0.16 wt %, 0.17 wt %, 0.18 wt %, 0.19 wt %, 0.20 wt %, 0.21 wt %, 0.22 wt %, 0.23 wt %, 0.24 wt %, 0.25 wt %, 0.26 wt %, 0.27 wt %, 0.28 wt %, 0.29 wt %, 0.30 wt %, 0.31 wt %, 0.32 wt %, 0.33 wt %, 0.34 wt %, 0.35 wt %, 0.36 wt %, 0.37 wt %, 0.38 wt %, 0.39 wt %, 0.40 wt %, 0.50 wt %, 0.60 wt %, 0.70 wt %, 0.80 wt %, 0.90 wt %, 1.0 wt %, or an amount that falls within a range defined by any two of the listed amounts.

The formulation can optionally include one or more fragrances. In examples, fragrances can include any odoriferous material including materials such as aldehydes, ketones, and esters. In examples, a fragrance can be synthetic, a naturally occurring plant or animal oils and exudates, or a combination thereof. Non-limiting examples of fragrances may include phenyl ethyl alcohol, linalool, geraniol, citronellol, cinnamic alcohol, iso bornyl acetate, benzyl acetate, para-tertiary-butyl cyclohexyl acetate, linalyl acetate, dihydro-nor-dicyclopentadienyl acetate, dihydro-nor-dicyclopentadienyl propionate, amyl salicylate, benzyl salicylate, para-iso-propyl alpha-oxtyl hydrocinnamic aldehyde, hexyl cinnamic aldehyde, hydroxy citronellal, heliotropin, and anisaldehyde and others as, for example, disclosed in U.S. Pat. Nos. 4,145,184, 4,209,417, 4,515,705, and 4,152,272, all of which are fully incorporated herein by reference. In examples, a fragrance that may be employed in the formulation may include a synthetic fragrance for example of Red Berry, New Car, Spring Waterfall, Velocity Mod (Symrise), Cool Mist, Island Oasis, or any like fragrances, including any combination thereof. The fragrance, when used, comprises about 0.0001 wt % to about 10 wt %, typically about 0.001 wt % to about 5 wt %, and more typically about 0.01 wt % to about 1 wt % of the formulation. For example, the formulation may include 0.10 wt %, 0.20 wt %, 0.30 wt %, 0.40 wt %, 0.50 wt %, 0.60 wt %, 0.70 wt %, 0.80 wt %, 0.90 wt %, 1.0 wt %, 2.0 wt %, 3.0 wt %, 4.0 wt %, 5.0 wt %, or an amount that falls within a range defined by any two the listed amounts.

In examples, the formulation may optionally include one or more opacifiers. An opacifier may be used to make the formulation opaque so that it can be more easily seen on the surface of a substrate. One or more opacifiers can optionally be included in the formulation. Non-limiting examples of opacifiers that can be used include Acusol OP302b (e.g., styrene/acrylic copolymers) commercially available from Rohm & Haas. The opacifier, when used, may be present in the formulation at about 0.001-3 wt %, for example about 0.04-2 wt %, about 0.05-1 wt %, about 0.1-1 wt %, or about 0.2-0.8 wt %.

In examples, the formulation may include one or more of a variety of builders. Non-limiting examples of builders that can be used include phosphate-silicate compounds, zeolites, alkali metal, ammonium and substituted ammonium polyacetates, trialkali salts of nitrilotriacetic acid, carboxylates, polycarboxylates, carbonates, bicarbonates, polyphosphates, aminopolycarboxylates, polyhydroxysulfonates, and starch derivatives. In examples, the builders can also or alternatively include polyacetates and polycarboxylates. The polyacetate and polycarboxylate compounds may include, but are not limited to, sodium, potassium, lithium, ammonium, and substituted ammonium salts of ethylenediamine tetraacetic acid, ethylenediamine triacetic acid, ethylenediamine tetrapropionic acid, diethylenetriamine pentaacetic acid, nitrilotriacetic acid, oxydisuccinic acid, iminodisuccinic acid, mellitic acid, polyacrylic acid or polymethacrylic acid and copolymers, benzene polycarboxylic acids, gluconic acid, sulfamic acid, oxalic acid, phosphoric acid, phosphonic acid, organic phosphonic acids, acetic acid, and citric acid. These builders can also exist either partially or totally in the hydrogen ion form. The builder agent can include sodium and/or potassium salts of EDTA and substituted ammonium salts. The substituted ammonium salts may include, but are not limited to, ammonium salts of methylamine, dimethylamine, butylamine, butylenediamine, propylamine, triethylamine, trimethylamine, monoethanolamine, diethanolamine, triethanolamine, isopropanolamine, ethylenediamine tetraacetic acid and propanolamine.

In examples, when included in the formulation, the builder may be present in a range of about 0.01 wt % to about 4 wt %, for example about 0.04-3 wt %, about 0.1-2 wt %, about 0.15-1 wt %, or about 0.2-0.5 wt %.

In examples, the formulation can optionally include one or more wetting agents. Non-limiting examples of wetting agents include silicone wetting agents which can aid in the spreading and leveling of the formulation on a substrate surface. Non-limiting examples of wetting agents include, but are not limited to, polyalkyleneoxide modified polydimethylsiloxane, available from General Electric as Silwet 7650, polyalkyleneoxide modified heptamethyltrisiloxane, also available from General Electric as Silwet 7280 and Silwet 7608, silicone glycol copolymer surfactant, available from Dow Corning as DC 57 and the Dow Corning silicone polyether surfactant designated Q2-5211. Additional examples also include materials with additional leveling properties, such as for example, but not limited to alkyl methyl siloxanes DC 56 available from Dow Corning and organomodified dimethylsiloxane available from General Electric designated as Formasil 433. The wetting agents, when used, have content in the formulation of about 0.001-5 wt %.

In examples, the formulation can optionally include one or more propellants. In examples, the formulation can be in the form of an aerosol, particularly in a pressurized aerosol container employing a compressed gas or fluid to serve as a propellant system; however, this is not required. Suitable propellants included compressible gases, including but not limited to air, nitrogen, argon, helium, carbon dioxide, nitrous oxide, and mixtures thereof. Suitable propellants include those standard aerosols known in the art as "LPG" or "liquid petroleum gas" propellants. Non-limiting examples include, but are not limited to, those commonly designated as LPG A-46, LPG A-70, LPG A-108 and their mixtures and combinations with other aerosols. LPG consists of high purity hydrocarbons derived directly from oil wells, and as a by-product from the petroleum industry, consisting essentially of a mixture of propane, isobutane and n-butane. Other common volatile organic compounds and their derivatives may suitably be employed, including dialkyl ethers, such as dimethyl ether and diethyl ether and the petroleum ethers. Volatile organic compounds may also be suitably employed as propellants, include the alkane series from methane, propane, butane, pentane and hexane and all of their respective isomers, and mixtures thereof, alone and in combinations thereof. Propellants offering improved safety in terms of reduced or non-flammability are also suitable, and include such liquid propellants as those based on chlorofluorocarbons, even though it is realized that the chlorofluorocarbons are no longer generally used due to environmental considerations. Suitable alternatives, believed to be less harmful to the earth's environment and ozone layer, include non-halogenated and partially halogenated materials, such as hydrofluorocarbons (HFC), hydrofluoroalkanes (HFA) and hydrochloroalkanes (HCA) and hydrochlorofluorocarbons (HCFC). Some non-limiting examples include, but are not limited to HFC-125, HFC-134a, HFC-152a, HFC-227ea, HFC-245fa and HCFC-22. Also suitable are aerosol propellants approved by SNAP, under the United States Environmental Protection Agency (US-EPA) Significant New Alternatives Policy (detailed in Section 612 of the Clean Air Act), which includes oxygenated organic solvents (esters, ethers, alcohols) chlorinated solvents (trichloroethylene, perchloroethylene, methylene chloride), trans-1,2-dichloroethylene, hydrofluoroether (HFE) 7100 and HFE 7200, monochlorotoluenes and benzotrifluorides, (subject to a 50 ppm workplace standard for monochlorotoluenes and a 100 ppm standard for benzotrifluoride), HFC-4310mee (subject to a 200 ppm time-weighted average workplace exposure standard and 400 ppm workplace exposure ceiling HFC-365mfc), HCFC-225ca/cb, perfluorocarbons (PFCs) and perfluoropolyethers (PFPEs) (subject to need with no reasonable alternatives found sufficient for intended end use applications), HCFC-141b, terpenes, C5-C20 petroleum hydrocarbons, and HFC-245fa. When an aerosol formulation is employed, one or more corrosion inhibitors known in the art are generally included in the formulations to protect metal portions of the pressurized system, including the can, valve, valve spring, nozzle and components of the aerosol package and dispenser assembly. In suitable embodiments, the propellant comprises 1 wt % to about 90 wt %, typically 2 wt % to about 80 wt %, and more typically 5 wt % to about 70 wt % of the formulation.

In examples, the balance of the formulation may include an inorganic solvent. In examples, the inorganic solvent may include water. In examples, the water may include deionized water, distilled water, reverse osmosis water, or any mixture thereof. In examples, at least 45% of the inorganic solvent in the formulation may be deionized water. In examples, the inorganic solvent, for example water, may be present in the formulation in an amount of about 80 wt % to about 95 wt %, for example about 90 wt % to about 95 wt %. In examples, the water is present at a concentration of about 91 wt % to about 95 wt %, for example 91 wt % to 94 wt %, 91 wt % to 93 wt %, 91 wt % to 92 wt %, 92 wt % to 95 wt %, 92 wt % to 94 wt %, 92 wt % to 93 wt %, 93 wt % to 95 wt %, or 93 wt % to 94 wt %.

In examples, the formulation may be formed by mixing the organic solvent, silicone fluid, and other components at atmospheric conditions, i.e. at room temperature and pressure. In examples, the process may include the use of a mixer equipped with an agitator.

In examples, about half of the water that ultimately is present in the formula is first added to the mixer. The water is agitated at a speed sufficient to induce fluid motion. In examples, the fluid motion can be sufficient for substantially complete fluid motion. In examples, the agitation is controlled to avoid or minimize air entrainment, i.e. avoid or minimize the formation of air bubbles in the fluid. In examples, agitation is maintained continuously throughout the addition of all the components that make up the formulation.

In examples, by adding only half the water that ultimately is intended for the formulation it may be possible to obtain higher shear during the overall mixing process, which can lead to improved break down of the silicone fluid particles into smaller particles when the silicone fluid is added.

In examples, once the fluid motion is achieved, one or more rheology modifiers may added to the water. Addition of one or more surfactants may follow the addition of the one or more rheology modifiers. In examples where at least two surfactants are added, the surfactant with the higher HLB value is added first. In examples, no waiting period is necessary between the addition of the rheology modifier and the surfactants, or between the addition of surfactants.

In examples, one or more silicone fluids may be added after the one or more surfactants. In examples, adding silicone fluid after the rheology modifiers and the surfactants it may be possible to avoid unwanted gelling of the formulation.

In examples, one or more organic solvents, e.g. the GTL solvent, may be added after the one or more silicone fluids. No waiting period is necessary before the addition of the one or more silicone fluids or before the addition of the one or more organic solvents.

In examples, one or more additives such as fragrances or other components as described herein may be added after the one or more silicone fluids and before the one or more organic solvents.

In examples, one or more preservatives may be added after the one or more organic solvents and/or one or more additives, if present. One or more rheology modifying agents and/or pH adjusting agents may be added after the one or more preservatives.

In examples, the mixture may then be mixed for about 20 to 30 minutes. Through the process, the fluid motion should be maintained at about the same rate. As such, in examples, as the mixture thickens it may be necessary to increase the power to the agitator.

In examples, the remainder of the water may be added after about 20 to 30 minutes, and the formulation may be mixed for an additional 20 to 30 minutes.

In examples, if the ultimate formulation is stored for more than about 12 hours, it can be remixed for about 15 to 20 minutes prior to sampling and/or use.

In examples, the formulation as described may have different applications such as, but not limited to, automotive care applications, home care applications, personal care applications, industrial and institutional applications, pharmaceutical applications, textile applications, and the like.

In examples, the formulation may be used as a protectant solution and/or protectant formulation. In examples, the formulation may be used a cleaning solution and/or cleaning formulation. In examples, the formulation may be used as a protectant and as a cleaning solution and/or formulation. In examples, the formulation may be used to treat a surface to improve, impart and/or maintain shine and/or gloss. In examples, the formulation may be used to treat a surface as a cleanser. In examples, the formulation may be used to treat a surface to protect and clean the surface, improve, impart and/or maintain shine and/or gloss, or any combination thereof.

The formulation can be used for treating a host of inanimate surfaces including, but not limited to, hard and soft surfaces found throughout the interior and exterior of the household and automotive areas. Household surfaces on which the formulation can be used include, but are not limited to, floors, counter tops, furniture, walls and surfaces constructed of glass, plastic, fiberglass, laminates, such as Formica™ and Corian™, tile, porcelain, brick, concrete, limestone, grout, marble, granite as well as metallic surfaces such as aluminum, steel, stainless steel, iron, chrome, copper, brass and the like. Other household surfaces include carpet, upholstery, vinyl, leather, textiles, fabric, floors, walls, ceilings and wall finishes, such as wallpaper, painted surfaces and panels. Automotive surfaces on which the formulation may be used include tires, rubber, vinyl, fabric, plastic and general elastomer surfaces found on the exterior and interior of a boat, vehicle, automobile, bus, car, plane, motorcycle and the like.

In examples, the formulation as described may be configured to be applied to the target surface by a variety of means, including direct application by means of a spray, pump or aerosol dispensing means, or by other means, including the use of a carrier, or dilution system, as for example, but not limited to a wash, dip or immersion process. Regarding applications by use of a carrier, such suitable carriers include, for example, an impregnated wipe, foam, sponge, cloth, towel, tissue or paper towel or similar releasably absorbent carrier that enables the formulations to be applied by direct physical contact and transferred from the carrier to the target surface, generally during a spreading, padding, rubbing or wiping operation. Combinations of a direct application, followed by a spreading, padding, rubbing or wiping operation performed with the aid of a foam, sponge, cloth, towel, tissue or paper towel, squeegee or similar wiping implement is also suitable for applying the formulations described herein.

The formulation may be configured to be sprayed directly onto the target surface and therefore are typically packaged in a spray dispenser. The spray dispenser can be any of the manually activated means for producing a spray of liquid droplets as is known in the art, e.g., trigger-type, pump-type, electrical spray, hydraulic nozzle, sonic nebulizer, high pressure fog nozzle, non-aerosol self-pressurized, and aerosol-type spray means. Automatic activated means can also be used herein. These types of automatic means are similar to manually activated means with the exception that the propellant is replaced by a compressor. The spray dispenser can be an aerosol dispenser. Said aerosol dispenser comprises a container which can be constructed of any of the conventional materials employed in fabricating aerosol containers. A more complete description of commercially available aerosol-spray dispensers appears in U.S. Pat. Nos. 3,436,772 and 3,600,325, both of which are fully incorporated herein by reference. Alternatively, the spray dispenser can be a self-pressurized non-aerosol container having a convoluted liner and an elastomeric sleeve. A more complete description of self-pressurized spray dispensers can be found in U.S. Pat. Nos. 4,260,110; 5,111,971 and 5,232,126, both of which are fully incorporated herein by reference. The container and the pump mechanism can be constructed of any conventional material employed in fabricating pump-spray dispensers, including, but not limited to: polyethylene; polypropylene; polyethyleneterephthalate; blends of polyethylene, vinyl acetate, and rubber elastomer. Other materials can include stainless steel. A more complete disclosure of commercially available dispensing devices appears in: U.S. Pat. Nos. 4,082,223; 4,161,288; 4,274,560; 4,434,917; 4,735,347; 4,819,835; 4,895,279; and 5,303,867; all of which are fully incorporated herein by reference.

EXAMPLES

Non-limiting examples of the formulation as described herein are provided in the following examples. These are only examples and other formulations may be possible within the scope of the description. Example formulations 1 to 7 were made to be applied by spray. Example formulations 8 to 14 were made to be applied by wiping.

In Examples 1-14, the formulations were formed by the process described herein. About half of the water ultimately in the formulation was first added to a mixer and agitation was commenced. To the water the following were added in order, Acusol 801S, Berol 266 SA, Berol 260 SA, Shell GTL GS 310, Xiameter PMX-200 1,000 cSt (examples 1-6 and 8-13) or Xiameter PMX-200 12,500 cSt (examples 7 and 14), fragrance (Red Berry—raw material product number 868066), Troygard BC11, and TEA 75%. The mixture was agitated for about 20 min, at atmospheric conditions, i.e. room temperature and pressure. The remaining water was then added and the formulation mixed for another 20 min.

| Material | Ex. 1 (spray) wt % | Ex. 2 (spray) wt % | Ex. 3 (spray) wt % | Ex. 4 (spray) wt % | Ex. 5 (spray) wt % | Ex. 6 (spray) wt % |
|---|---|---|---|---|---|---|
| DI Water | 45.00% | 45.00% | 45.00% | 45.00% | 45.00% | 45.00% |
| Acusol 801S | 1.00% | 1.00% | 1.00% | 1.00% | 1.00% | 1.00% |
| Berol 266 SA | 0.45% | 0.45% | 0.45% | 0.45% | 0.45% | 0.45% |
| Berol 260 SA | 0.27% | 0.27% | 0.27% | 0.27% | 0.27% | 0.27% |
| Shell GTL Fluid: GS-310 | 1.25% | 1.25% | 1.25% | 1.25% | 1.25% | 1.25% |
| Xiameter PMX-200 - Silicone Fluid 1000 cSt | 2.50% | 2.50% | 2.50% | 2.50% | 2.50% | 2.50% |
| Fragrance[1] | 0.00% | 0.30% | 0.30% | 0.30% | 0.30% | 0.30% |
| Troyguard BC11 | 0.10% | 0.10% | 0.10% | 0.10% | 0.10% | 0.10% |
| TEA 75% | 0.43% | 0.43% | 0.43% | 0.43% | 0.43% | 0.43% |
| Deionized or RO Water | 49.00% | 48.70% | 48.70% | 48.70% | 48.70% | 48.70% |

| Material | Ex. 8 (wipe) wt % | Ex. 9 (wipe) wt % | Ex. 10 (wipe) wt % | Ex. 11 (wipe) wt % | Ex. 12 (wipe) wt % | Ex. 13 (wipe) wt % |
|---|---|---|---|---|---|---|
| DI Water | 45.00% | 45.00% | 45.00% | 45.00% | 45.00% | 45.00% |
| Acusol 801S | 1.00% | 1.00% | 1.00% | 1.00% | 1.00% | 1.00% |
| Berol 266 SA | 0.90% | 0.90% | 0.90% | 0.90% | 0.90% | 0.90% |
| Berol 260 SA | 0.36% | 0.36% | 0.36% | 0.36% | 0.30% | 0.36% |
| Shell GTL Fluid: GS-310 | 1.25% | 1.25% | 1.25% | 1.25% | 1.25% | 1.25% |
| Xiameter PMX-200 - Silicone Fluid 1000 cSt | 2.50% | 2.50% | 2.50% | 2.50% | 2.50% | 2.50% |
| Fragrance[1] | 0.00% | 0.30% | 0.30% | 0.30% | 0.30% | 0.30% |
| Troyguard BC11 | 0.22% | 0.22% | 0.22% | 0.22% | 0.22% | 0.22% |
| TEA 75% | 0.43% | 0.43% | 0.43% | 0.43% | 0.43% | 0.43% |
| Deionized or RO Water | 48.34% | 48.04% | 48.04% | 48.04% | 48.10% | 48.04% |

[1]Fragrance used: New Car 310055 (Ex. 2 & 9), Red Berry 868066 (Ex. 3 & 10), Spring Waterfall 617908 (Ex. 4 & 11), 358992 Velocity Mod (Symrise), Cool Mist (Ex. 5 & 12), Island Oasis 310059 (Ex. 6 & 13).

In examples 7 and 14 the amount of GTL solvent and silicone fluid were increased to achieve a higher degree of gloss and/or shine.

| Material | Ex. 7 (spray) wt % | Ex. 14 (wipe) wt % |
|---|---|---|
| DI Water | 45.00% | 45.00% |
| Acusol 801S | 1.10% | 1.10% |
| Berol 266 SA | 0.58% | 0.74% |
| Berol 260 SA | 0.45% | 0.36% |
| Shell GTL Fluid: GS-310 | 1.75% | 1.50% |
| Xiameter PMX-200 - Silicone Fluid 12500 cSt | 4.00% | 4.40% |
| Troyguard BC11 | 0.10% | 0.22% |
| TEA 75% | 0.39% | 0.39% |
| Deionized or RO Water | 46.64% | 46.29% |

The example formulations were tested on vinyl samples and interior car surfaces. Example formulations 1 to 7 were applied via spray. Example formulations 8-14 were applied using a wipe. Varying types of substrate materials were used as wipes, mostly synthetic substrates. For the tests where the formulation was sprayed, a microfiber towel was used to spread/wipe the formulation after it was sprayed onto the surface. Observations on the results were made about 5 to 10 min after application of the formulation to the surface.

In Comparative Examples, GTL solvent was replaced with a natural oil or a mineral oil that do not meet the viscosity ranges described herein. Such formulations exhibited excessive degree of greasiness and undesirable for the intended use. In Comparative Examples, silicone of a viscosity below 1000 cSt was used in the formulation. To achieve the desired degree of glossiness and shine, the amount of silicone required when using one with a viscosity below 1000 cSt was much higher than 3 wt %, and also 10 wt % or higher. Thus, the Comparative Examples did not result in a reduced amount of silicone. In examples, surfactants with HLB value below 7 were tested and did not result in a formulation with the desired properties.

Comparative Examples A-D were prepared in a similar manner as Examples 1-14, but with different compositions and/or concentrations.

Comparative Examples A-C were prepared for spray application and tested as such like Examples 1-7 above, and Comparative Example D was prepared for the wipe application and tested as such like Examples 8-14.

Comparative Example A

In Comparative Example A, the a mineral oil, such as Semtol 500, was used in place of a GTL solvent or of an organic solvent as described previously. This solution demonstrated a degraded performance. The solution did not spread well and thus did not provide a formulation in which silicone fluid could be reduced to a level comparable to the present invention.

Comparative Example A Formulation:

| Material | wt % |
|---|---|
| DI Water | 45.00% |
| Acusol 801S | 1.20% |
| Berol 266 SA | 0.36% |
| Berol 260 SA | 0.36% |
| Mineral Oil (Semtol 500) | 1.75% |
| Silicone Fluid 1000 cSt | 4% |
| Troyguard BC11 | 0.10% |
| TEA 75% | 0.43% |
| Deionized or RO Water | 46.80% |

Comparative Example B

In Comparative Example B, mineral oil, such as Semtol 500, was used in place of a GTL solvent or of an organic solvent as described previously as done in Comparative Example A. Also, in Comparative Example B, the silicone fluid used had a viscosity of 500 cSt. The solution demonstrated that the level of silicone fluid could not be reduced below 10 wt % without losing performance.

Comparative Example B Formulation:

| Material | Formula % |
|---|---|
| DI Water | 50.00% |
| Semtol 500 (Mineral Oil) | 5.00% |
| Silicone 350 | 10.00% |
| Berol 266 SA | 0.24% |
| Berol 260 SA | 0.24% |
| Acusol 801S | 1.21% |
| Troyguard BC11 | 0.20% |
| TEA | 0.39% |
| Deionized or RO Water | 32.72% |

Comparative Example C

In Comparative Example C the a solution was mixed but using only a single surfactant instead of two surfactants as described earlier and as exemplified in Examples 1-14. The result was a formulation that did not spread as well as when two surfactants are used as previously discussed and exemplified.

Comparative Example C Formulation:

| Material | Formula % |
|---|---|
| DI Water | 45.00% |
| Acusol 801S | 1.00% |
| Berol 266 SA | 0.45% |
| Shell GTL Fluid: GS-310 | 1.25% |
| Xiameter PMX-200 - Silicone Fluid 1000 cSt | 2.50% |
| Troyguard BC11 | 0.10% |
| TEA 75% | 0.43% |
| Deionized or RO Water | 49.27% |

Comparative Example D

In Comparative Example D, mineral oil was used in place of a GTL solvent or of an organic solvent as described previously as done in Comparative Example A. Also, in Comparative Example D, the silicone fluid used had a viscosity of 12500 cSt. The solution did not spread well due to high level of greasiness and required higher levels of surfactant. The solution also did not interact well with the wipe substrate material.

Comparative Example D Formulation:

| Material | Formula % |
|---|---|
| Deionized or RO Water | 45.00% |
| Acusol 801S | 1.10% |
| Berol 266 SA | 0.90% |
| Berol 260 SA | 0.36% |
| Mineral Oil | 1.50% |
| Silicone Fluid 12,500 cSt | 5.00% |
| Troyguard BC 11 | 0.22% |
| TEA 75% | 0.39% |
| Deionized or RO Water | 45.53% |

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present disclosure, which is set forth in the following claims.

What is claimed is:

1. An aqueous formulation comprising:

a gas-to-liquid paraffinic solvent;

a silicone fluid having a viscosity of at least about 1000 cSt;

a surfactant; and an inorganic solvent.

2. The aqueous formulation of claim 1, wherein a total concentration of silicone fluid in the aqueous dispersion is less than 3 wt %.

3. The aqueous formulation of claim 1, wherein the gas-to-liquid paraffinic solvent (i) comprises a synthetic hydrocarbon;

(ii) comprises a hydrocarbon having a carbon content within the range of C18 to C24;

(iii) has a viscosity within a range of 1 $mm^2/s$ to 10 $mm^2/s$; and/or (iv) is present in an amount of 1 wt % to 5 wt %.

4. The aqueous formulation of claim 1, wherein (i) the silicone fluid is present in an amount in the range of 1 wt % to 3 wt %; and/or (ii) the aqueous formulation further comprises a second silicone fluid having a viscosity below 1000 cSt, and wherein the first silicone fluid is present in an amount of at least 1.5 wt %.

5. The aqueous formulation of claim 1, wherein the surfactant is a non-ionic surfactant.

6. The aqueous formulation of claim 1, wherein the inorganic solvent is water.

7. The aqueous formulation of claim 1, further comprising (i) a pH adjusting agent and a preservative; and/or (ii) one or more rheology modifiers.

8. The aqueous formulation of claim 1, the formulation comprising:

a gas-to-liquid paraffinic solvent in an amount of 1 wt % to 5 wt %;

a silicone fluid in an amount of 0.5 wt % to 3 wt %;

a rheology modifier in an amount of 0.5 wt % to 1.5 wt %;

a surfactant in an amount of 0.5 wt % to 1.5 wt %;

a preservative in an amount of 0.001 wt % to 1 wt %;

a pH adjusting agent in an amount of 0.01 wt % to 4 wt %; and water.

9. The aqueous formulation of claim 8, wherein the gas-to-liquid paraffinic solvent is a synthetic paraffinic hydrocarbon that is less than 2% aromatic and has a viscosity that is less than 20 mm2/s.

10. The aqueous formulation of claim 8, wherein the silicone fluid comprises a silicone having a viscosity of at least 1000 cSt.

11. The aqueous formulation of claim 8, wherein the rheology modifier comprises a hydrophobically modified alkali-swellable emulsion.

12. The aqueous formulation of claim 8, wherein the surfactant comprises a first surfactant with a first HLB value and second surfactant with a second HLB value different from the first HLB value.

13. The aqueous formulation of claim 8, wherein the pH adjusting agent comprises TEA 75%.

14. A method of preparing the formulation of claim 1, the method comprising:

adding a rheology modifier to water;

adding one or more surfactants after the addition of the rheology modifier;

adding a silicone fluid after the one or more surfactants;

adding the gas-to-liquid paraffinic solvent after the silicone fluid;

adding a pH adjusting agent after the organic solvent; and adding additional water after the pH adjusting agent.

15. The method of claim 14, the method further comprising continuously agitating the formulation.

16. The method of claim 14, the method further comprising adding a preservative after the organic solvent and before the additional water.

17. The method of claim 14, the method comprising delaying the adding of the additional water by 20 min.

18. The method of claim 17, the method further comprising continuing agitation for about 20 min after the adding of the additional water.

19. A method of treating a surface, the method comprising:

spraying the surface with the aqueous formulation of claim 1; or applying to a wiper the aqueous formulation of claim 1 and wiping the surface with the wiper with the formulation applied thereto.

* * * * *